H. D. POWNALL.
PROCESS OF PRODUCING ARTIFICIAL ICE.
APPLICATION FILED JUNE 21, 1913.
1,180,533.
Patented Apr. 25, 1916.
2 SHEETS—SHEET 1.
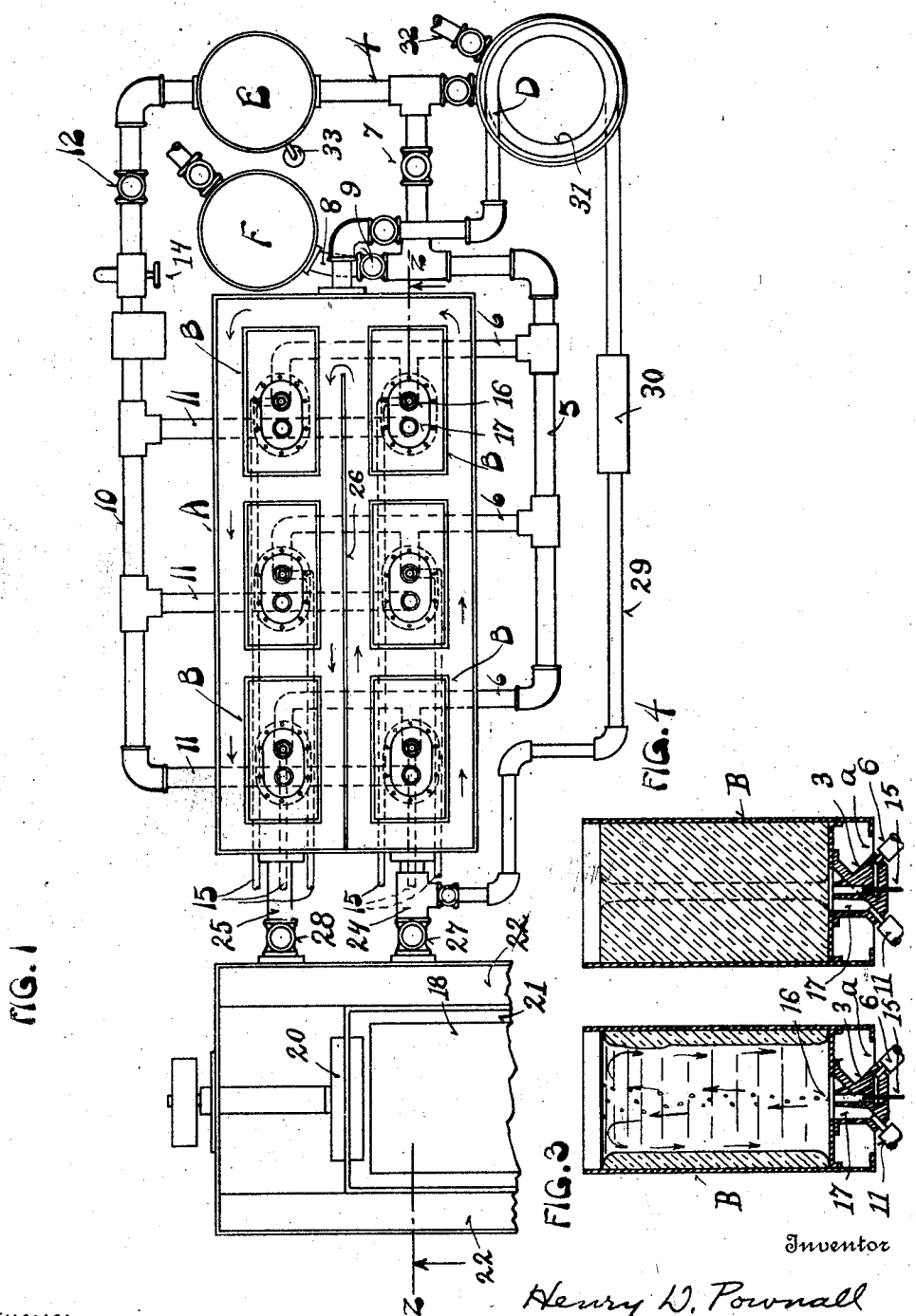

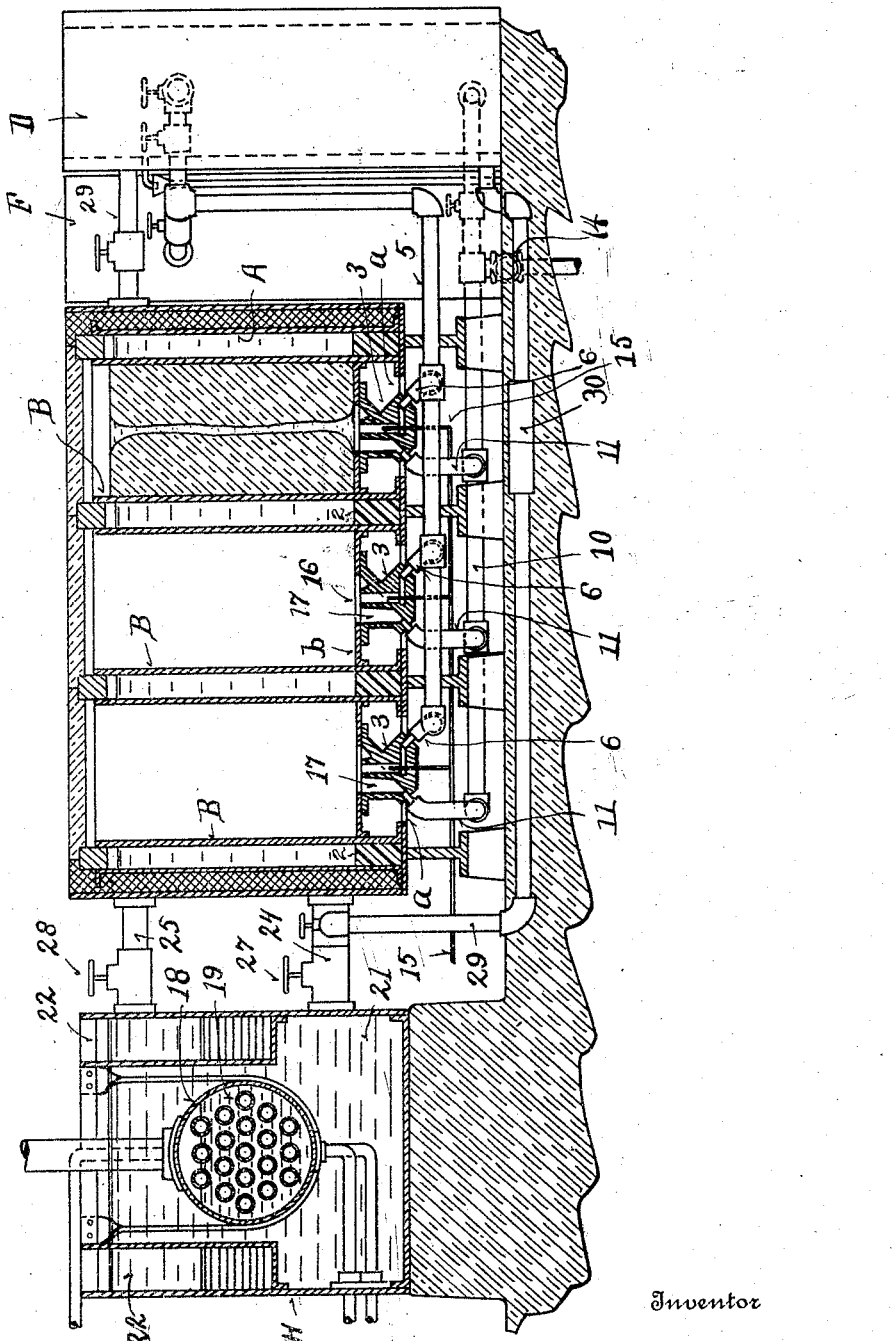

UNITED STATES PATENT OFFICE.

HENRY D. POWNALL, OF CANTON, OHIO.

PROCESS OF PRODUCING ARTIFICIAL ICE.

1,180,533.  Specification of Letters Patent.  Patented Apr. 25, 1916.

Application filed June 21, 1913. Serial No. 774,995.

*To all whom it may concern:*

Be it known that I, HENRY D. POWNALL, a citizen of the United States, residing at Canton, in the county of Stark and State of Ohio, have invented certain new and useful Improvements in Processes of Producing Artificial Ice, of which the following is a specification.

My invention relates to improved method or process of producing artificial ice.

One of its objects is to provide an improved method of producing pure and clear artificial ice from raw water.

Another object is to provide a process of producing clear and pure artificial ice in cans, and whereby a white or discolored core is avoided.

Another object is to provide a method of producing artificial ice in which the impurities rejected by the forming ice are progressively eliminated.

Another object is to provide a method of forming artificial ice in which raw and distilled water are successively employed in the formation of the ice blocks.

My invention also comprises certain details of the method components and their order or sequence, all of which will be fully set forth in the description of the accompanying drawings, in which;

Figure 1 is a top plan view of one form of apparatus adapted to carry out my improved process. Fig. 2 is a vertical section through the same on line $z$ $z$ of Fig. 1. Fig. 3 is a vertical sectional detail through one of the ice molds in an early stage of the freezing process. Fig. 4 is a view similar to Fig. 3 with the ice block completely frozen.

In the manufacture of artificial ice from raw water, that is water which has not been distilled, the raw water contains certain impurities which may be designated as silt; certain salts in solution; and certain gases in solution, any one of which would tend to prevent the production of pure and clear ice, most acceptable to the market. Such water may also contain bacteria and other living organisms which it is desirable to remove for hygienic and sanitary reasons, and my improved method is adapted to eliminate all of said foreign substances and organisms, and to produce from raw water artificial ice of a high grade of purity and transparency throughout.

In carrying out my improved method I preferably employ a tank A in which a refrigerating medium is to be circulated. A series of ice molds B are located systematically in the tank so as to leave narrow lanes or channels in which the refrigerating medium circulates and comes in contact with the side walls of the ice molds. Each of the ice molds is detachably seated over an opening $a$ in the bottom of the tank, and an insulating material 2 is located in the bottom of the tank surrounding the lower portion of the ice molds to a point slightly above the bottoms of the ice molds to seal the joints and to control the freezing in the molds so that the freezing will be practically uniform from top to bottom along the sides of the ice molds, and so that it will not freeze more rapidly or more extensively near the bottom of the molds.

Coupling members 3 are attached near the center to the bottoms $b$ of the respective ice molds, and a series of conduits are connected to said coupling member to supply raw water, or distilled water to said ice molds; to withdraw water from said ice molds; and to supply air under pressure to said molds.

D represents a supply reservoir in which the raw water is cooled to near the freezing point. This reservoir D is connected by a valve controlled pipe 4 with a raw water settling reservoir E. A main water supply pipe 5 with branches 6 leads from the pipe 4 to coupling members 3 of the respective ice molds, said main pipe being provided with a valve 7. A branch 8 having a valve 9 is connected to a distilled water reservoir F. A return main 10 with branches 11 from the coupling members 3 of the respective ice molds leads to the raw water reservoir E and is provided with a controlling valve 12 and a drain branch controlled by valve 14. Thus either raw water or distilled water may be supplied to the ice molds as desired, and the drain valve 14 enables all or any portion of the water desired to be drained from the ice molds and the main and return conduits leading to and from said molds. Air under pressure is supplied, preferably from an elevated reservoir or main, not shown, to separate and independent air conduits 15 leading to the respective coupling members 3. Said coupling members are preferably so arranged that the incoming air and water enter the ice mold through a common passage 16, and so that the air causes a circulation of water to and from the ice mold, as indicated in Fig. 3, which circulation is maintained during the freezing of the raw water. The water exit 17 in the coupling member 3 is funnel shaped so as to direct any sediment or solid matter into the exit branch pipe 11.

Any type of brine cooler or means for refrigerating the cooling medium may be employed. As illustrated, H represents a brine cooler in which a liquefied gas is located in a container 18 and surrounding the flues 19 through which the brine or refrigerating medium is circulated by a propeller 20 to cool the same. The brine cooler is divided into a central compartment 21 and two shallow troughs 22 at the sides, and a conduit 24 leads from the compartment 21 to the tank A near the bottom, while a conduit 25 leads from the tank to the trough of the cooler near the top of the tank. A partition 26 causes the cooling medium to flow in a loop shaped path through the tank A around the ice molds and back to the cooler. Valves 27 and 28 in the conduits 24 and 25 serve to cut off the circulation of the cooling medium. A by-pass conduit 29 in which there is a circulating pump 30 and a coil 31 immersed in the water of reservoir D enables the cooling medium trapped in the tank A by closing the valves 27 and 28 to be circulated through said coil and its temperature raised thereby to release the ice from the molds in harvesting.

In practice raw water is supplied by valve controlled pipe 32 to reservoir D where it is chilled and then is drawn into the reservoir E and through the pipes 5 and 6 to the ice molds, a uniform level being maintained by means of an overflow pipe 33 at the tank E. The drain valve 14 being closed, and valve 12 opened, the raw water is free to circulate from the reservoir E through the respective ice molds and return to said reservoir, and due to the slow moving current in said reservoir E the solid matter will settle to the bottom of said reservoir and become eliminated, and may be blown off from time to time through a blow off pipe. Air is admitted to the respective ice molds through the conduits 15 and the cooling medium is circulated through the tank A to and from the brine cooler H. The air escaping through the passages 16 and molds B causes water from tank E to blow continuously through the pipes 5 and 6 to the respective ice molds and after making a loop shaped circuit through the ice molds in contact with the face of the forming ice as indicated in Fig. 3. to return to the tank E through pipes 10 and 11, carrying with it any solid impurities such as silt or salts thrown out of solution, while gases in solution are detached from the face of the forming ice by the water current or carried away with the escaping air, and any organisms going with and settling out with the silt, or remaining in the unfrozen water.

The freezing progresses steadily inwardly from the side walls of the molds until only a small open channel as indicated in the right hand mold of Fig. 2 remains, whereupon the valves 7 and 12 are closed and the supply of air to pipes 15 cut off. The valve 14 is then opened and the raw water remaining in the ice molds and in the conduits 10 and 11 is drained out and preferably wasted. The raw water remaining in conduits 5 and 6 is negligible in quantity, and may be left to mingle with the distilled water or may be drained therefrom by a separate drain in pipe 5 similar to drain 14 in pipe 10. After the raw water has been drained from the molds and valve 14 closed the valve 9 is opened and distilled water allowed to flow from tank F through pipes 5 and 6 to occupy the space in the center or core of the ice blocks in the molds, where the distilled water remains quiescent until frozen solid, as indicated in Fig. 4, where the dotted lines indicate the division lines between the raw and distilled water ice. The valves 27 and 28 are then closed and the valves of the by pass 29 opened and the pump 30 started which raises the temperature of the brine in tank A, to release the ice from the molds, and at the same time chills a body of water in reservoir D with which to refill the molds.

I have described the core of the partially formed blocks as being refilled with distilled water, but the term "distilled water" is intended to include any degasified water or water so treated and purified as to produce when congealed a clear or transparent core in the ice block, and the claims are to be interpreted accordingly.

It will be observed that my process not only involves the vertical circulation of water through the mold, but a continuous supply and escape of water to and from the bottom of the mold. To maintain the water at a predetermined level I preferably give the outlet port just sufficiently a greater area than the inlet port.

The water escaping around and below the raw water inlet contains the separated impurities which are thus prevented from commingling with the inflowing water, which would tend to carry them back into the mold, whereas it is my primary purpose to continuously and effectively remove such impurities, thereby forming absolutely clear ice.

As the air is introduced with the inflowing raw water, it acts as an injector or has a siphonic influence which effectually assists in inducing a flow of the clarified water from the separating tank into the mold, which clarified water is in a continuously better condition to form clear ice, upon its reintroduction into the freezing zone.

The method of process herein set forth is capable of considerable modification without departing from the principle of my invention.

Having described my invention, what I claim is:

1. The process of producing artificial ice comprising subjecting raw water simultaneously in a plurality of ice molds to refrigeration through the side walls of the molds, circulating raw water in a circuitous route to and from the respective molds during the refrigerating operation, until the ice formed occupies a major portion of the space within the molds with unfrozen cores open at top and bottom, simultaneously draining unfrozen water from said cores through the bottoms of said molds, simultaneously refilling said core spaces through the bottoms of the molds with distilled water, and continuing the refrigeration until the distilled water is congealed to form, with the previously formed ice, solid blocks.

2. The process of producing artificial ice comprising first subjecting raw water in an ice mold to refrigeration through the side walls of the mold, and circulating raw water to and from the mold, until the ice formed occupies the major portion of the space within the mold with an unfrozen core open at top and bottom, then draining the unfrozen water from the mold at the bottom, and refilling the space so drained with distilled water introduced through the bottom of the mold, and continuing the refrigeration until the distilled water is congealed to form, together with the previously formed ice, a solid block.

3. The process of producing artificial ice comprising first subjecting raw water in an ice mold to refrigeration through its side walls and agitating said raw water to free the forming ice from impurities, until the ice so formed occupies the major portion of the space within the mold leaving an unfrozen core open at top and bottom, then draining the unfrozen raw water and impurities from the mold at its bottom and refilling the space so drained with distilled water introduced through the bottom of the mold and continuing the refrigeration until the distilled water is congealed to form, together with the previously formed ice, a solid block.

4. The process of producing artificial ice comprising subjecting raw water simultaneously in a plurality of ice molds to refrigeration through the side walls of said molds, agitating the raw water in said respective molds to free the forming ice from impurities until tubular blocks of ice open at top and bottom and occupying the major portion of the respective molds are formed, then simultaneously draining the unfrozen raw water at the bottom from said molds and refilling the space so drained from the bottom with distilled water, and continuing the refrigeration until the distilled water is also congealed to form with said previously formed ice solid blocks.

5. The process of producing artificial ice comprising subjecting raw water simultaneously in a plurality of ice molds to refrigeration through the side walls of said molds, introducing air under pressure at the bottom of said respective molds to agitate the raw water and separate impurities from the forming ice therein, thereby producing tubular blocks of ice from raw water open at top and bottom and occupying the major portion of said respective molds, then draining the unfrozen raw water and impurities from said molds at the bottom and refilling the spaces so drained from the bottom of the molds with distilled water, discontinuing the air supply and continuing the refrigeration until the distilled water in the molds is also congealed to form with the previously formed ice solid blocks.

6. The process of producing artificial ice comprising circulating a refrigerating medium exteriorly in contact with the side walls of a plurality of ice molds, and subjecting raw water within said molds to the refrigerating action of said refrigerating medium, admitting air under pressure to said respective molds at the bottom to cause an agitation of the raw water in the respective molds and an elimination of impurities from the forming ice, whereby tubular blocks of ice with unfrozen cores open at top and bottom and with the ice occupying the major portion of said molds are formed from raw water, then simultaneously draining the raw water and impurities from the centers of said blocks at the bottom and simultaneously refilling the spaces so drained from the bottom with distilled water, and subjecting the distilled water in said molds to the action of said refrigerating medium until congealed, thereby forming in conjunction with said raw water ice, solid ice blocks.

7. The process of producing artificial ice comprising circulating a refrigerating medium through a tank unit exteriorly in contact with the side walls of a plurality of ice molds located in said tank, subjecting raw water in said respective molds to refrigeration thereby to produce tubular blocks of ice having unfrozen cores open at top and bottom and occupying the major portion of said molds, continuously agitating the raw water in said molds to separate impurities from the face of the forming ice, at one operation draining the raw water and impurities at the bottom from the cores of said raw water ice blocks, at one operation refilling the spaces so drained from the bottom with distilled water, and subjecting the distilled water in said molds to the action of said refrigerant until congealed to form with said raw water ice composite blocks occupying substantially all of the space within said respective molds, and at one operation warming the exterior of said respective molds to detach the ice blocks therefrom and permit their removal.

In testimony whereof I have affixed my signature in presence of two witnesses.

HENRY D. POWNALL.

Witnesses:
 DAVID B. DAY,
 ARTHUR G. FIFE.